Gambrill & Burgee.
Carding Engine.

N°. 18,124.  Patented Sep. 1, 1857.

N. PETERS, PHOTO-LITHOGRAPHER, WASHINGTON, D.C.

UNITED STATES PATENT OFFICE.

HORATIO N. GAMBRILL AND SINGLETON F. BURGEE, OF WOODBURY, MARYLAND.

IMPROVEMENT IN CARDING-ENGINES.

Specification forming part of Letters Patent No. 18,124, dated September 1, 1857.

*To all whom it may concern:*

Be it known that we, HORATIO N. GAMBRILL and SINGLETON F. BURGEE, of Woodbury, in the county of Baltimore and State of Maryland, have invented certain new and useful Improvements in Carding-Engines; and we do hereby declare the following to be a full, clear, and exact description of the same, reference being had to the accompanying drawings, making a part of this specification, in which—

Figure 1:
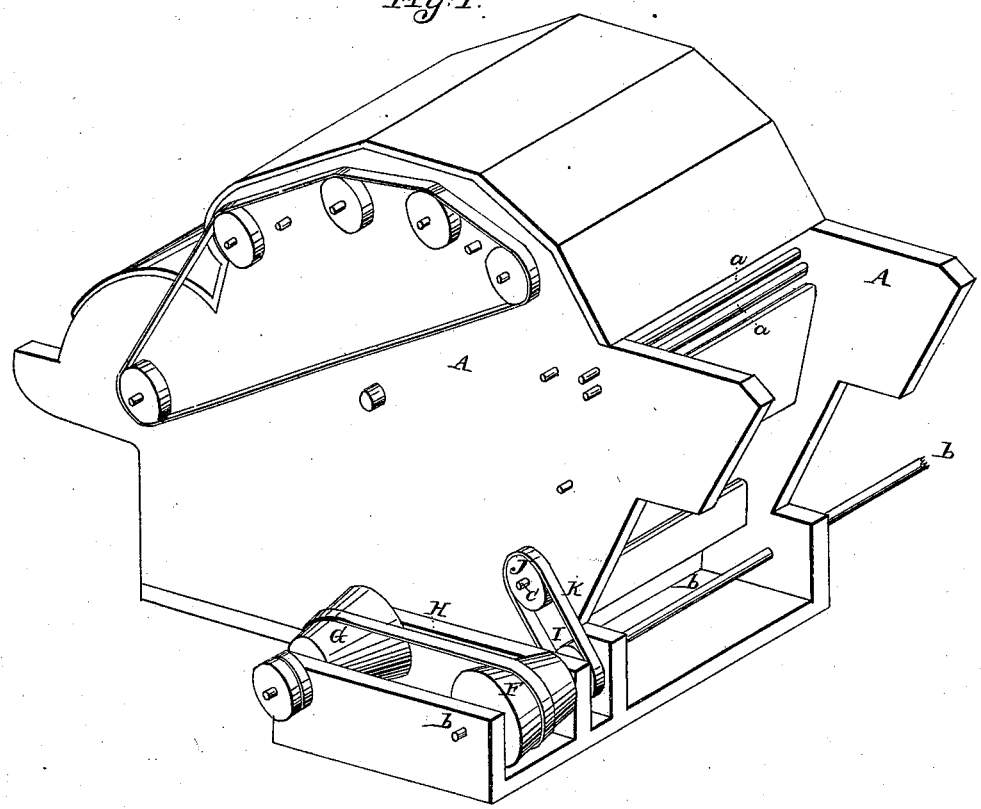
Figure 2:
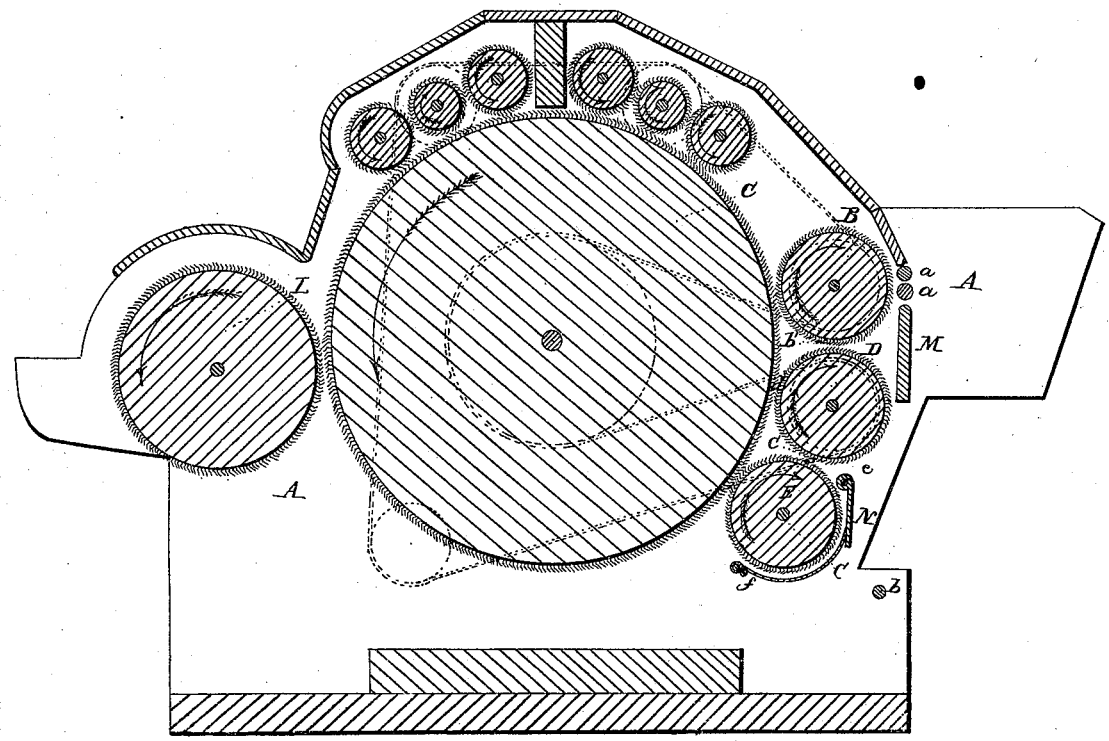

Figure 1 represents a perspective view of the machine. Fig. 2 represents a vertical section through the same.

Similar letters of reference, where they occur in the separate figures, denote like parts of the machine in both the figures.

To enable others skilled in the art to make and use our invention, we will proceed to describe the same with reference to the drawings, first stating that the frame, bearings, or boxes for the journals of the cylinders and other portions of the engines not specially referred to or shown in the drawings may be of the ordinary well-known kind, and do not constitute any part of our invention. They will not, therefore, be specially described.

A may represent the side pieces or frames of the engine, within which are hung the several cylinders which will be referred to.

$a$ $a$ are the feed-rolls, which take the bat from the spool and deliver it to the "licker-in" B, which in turn gives it mainly to the main cylinder C. Underneath the licker-in B is placed a second cylinder D, which is so placed as to take from the licker-in and give up the material to the main cylinder C. This cylinder D acts as a worker in connection with the licker-in, taking from B a portion of its charge, carding it, in connection with the stripping-cylinder E, and delivering it to the main cylinder C.

E is a variable-motion cylinder, which is described and claimed in our patent of the 27th February, 1855. (Patented in England 22d August, 1854.) This "variable cylinder," as we term it, is located just below the cylinder D, and acts at times as a stripper to the main cylinder and at other times as a feeder to the said cylinder, just as its speed for the time being may be. It also gives its strippings to and mixes or cards them with the partially-carded material upon the intermediate cylinder D, and thus instead of returning strippings only to the main cylinder, it mixes said strippings with a better quality of fiber and returns it mixed, which prevents an inferior fiber being placed on the cylinder, and makes greater uniformity in the sliver.

The cylinder D takes partially-carded material from the licker-in at $b'$, and takes strippings from the cylinder E at $c'$, and after carding and mixing delivers it onto the main cylinder at $d$; and although the cylinder E is at times taking from and at times giving to the main cylinder, yet it is at all times carding, in connection with the cylinder D. It will thus be seen that with one feed of lap or bat, as at $a$ $a$, there are two feeding-points onto the main cylinder—viz., by the cylinders B D—and if the variable cylinder be deemed a feeder, which it is at times, then there are three feeding-points on the main cylinder from one lap or bat and one set of feed-rolls. By this arrangement of cylinders we find by actual experiment that our engines are fully doubled in capacity, without any material addition to their original cost, while the product is more uniform and of a better quality.

In our patent heretofore cited we gave the variable motion to the cylinder by means of small cone-pulleys and a shipper attached to each separate engine. Although this accomplished the purpose, yet the pulleys were of necessity so small as to allow the belt to slip on them and give uncertainty of action. As carding-engines are always arranged in sections, tiers, or rows upon the same floor, we find not only great economy, but a much more perfect and reliable motion to be had by using one long continuous shaft $b$ throughout the section, line, or tier of machines and arranging the cone F upon one end of it, over which and over another cone G, driven from the first moving power, whatever it may be, passes a belt H, which, by means of an automatic shipper, is traversed along the cones, changing the motion of the one F and also of the long shaft $b$ on which it is placed. On this long shaft $b$ may be placed a pulley I, (one for each engine in the tier,) over which and over another pulley J on the journal $c$ of the variable cylinder E may pass an endless belt K, and thus by means of one set of cone-pulleys, and they of sufficient size to be regularly operated upon, a single shaft of the whole length of the section or tier of engines has a variable motion imparted to it, and from this shaft, by ordinary belt and pulleys, said variable motion is conveyed to each one of the series of engines, however long the line may be, and one set of cones may serve for a section of from ten to twenty machines, more or less.

Besides the economy of driving the variable cylinders throughout the section of carding-engines from the long shaft $b$ extending throughout their whole series, it causes each variable cylinder of the whole series to run with uniform motion and make their changes all at stated periods, and thus the sliver which is formed out of the product of the series or section of engines is of more uniform character, as every engine of the series must turn off uniform products, which are laid in the trough through which the sliver passes.

Between the licker-in and the doffer L we propose to use but two sets of workers and strippers, as shown in the drawings, as this number seems most economical; but we do not limit the number or their precise arrangement, leaving that to the judgment of the user.

M is a permanent casing below the feed-rolls $a\ a$ and extending over the lower half of the cylinder B and the upper half of the cylinder D. The object of this casing is, first, to direct the dirt carded out at the point $b$ downward, and, secondly, to cause the cotton, which flies off at this point, to fall onto and be caught by the cylinder D, and thus carried back and deposited on the main cylinder. Much waste and loss of material is made at this part of an ordinary carding-engine, and by means of this casing we make a saving of about four per cent. over the ordinary waste heretofore encountered.

A concave N is placed near the variable or stripping cylinder E, the top part $e$ of which is rounded off and approaches to, say, within a half or three-quarters of an inch of the bite of the cylinders D E. This concave is suspended at its upper end by a rod or shaft passing through and attached to the frames, and its lower end is prevented from swinging away too far from the cylinder E by stop $f$, but is free to be moved toward the cylinder by a set-screw or any other device should it become necessary to so move it. The concave may be made of sheet metal, and may be in one or two parts, the upper part hanging more in a perpendicular line than the under part, which may be of the form of the cylinder which it partially incloses. The object of this concave is to allow all the heavier dirt or impurities which are carded out at the point $c'$ to be thrown over the concave and fall down below, while all the cotton which is lighter will be caught by the cylinder on the inside of said concave, and thus saved and worked into the lap. A screen may underlie the main cylinder; but this has been used heretofore, and it, as well as many other parts of the carding-engine which are in common use and which we use, need not be here described.

Having thus fully described the nature of our invention, what we claim therein as new, and desire to secure by Letters Patent, is—

1. Delivering the cotton onto the main cylinder always at two, and sometimes at three, different points or places, while using but one set of feeding-rollers, substantially as herein described.

2. The combination of the working-cylinders B D and the working and stripping cylinder E, all running in the same direction and working in connection with each other and with the main cylinder, as set forth, the two first B D delivering the cotton to the main cylinder regularly, while the latter E is doing so at intervals, substantially as described.

3. Mixing the strippings taken from the main cylinder by the stripping-cylinder E with the cotton on the cylinder D, carding it and returning it thus mixed and carded to the main cylinder, substantially as set forth.

4. In combination with the cylinders, the stationary casing, and the concave for separating the dirt from the cotton while undergoing the carding process, as set forth.

5. In contradistinction from giving the variable motion to the cylinder E by cone-pulleys and a traveling belt attached to each carding-engine, the giving of said motion to a shaft or line of shafting and imparting it from said shafting to the engine by simple belt and pulleys, by which means more certain action is had and at less expense, as herein set forth.

HORATIO N. GAMBRILL.
SINGLETON F. BURGEE.

Witnesses:
THOS. HARRY UPPERMAN,
A. B. STOUGHTON.